March 30, 1971  R. E. GRIFFITH ET AL  3,573,140
HEATING JAW FOR IMPULSE SEALER
Filed Oct. 7, 1968
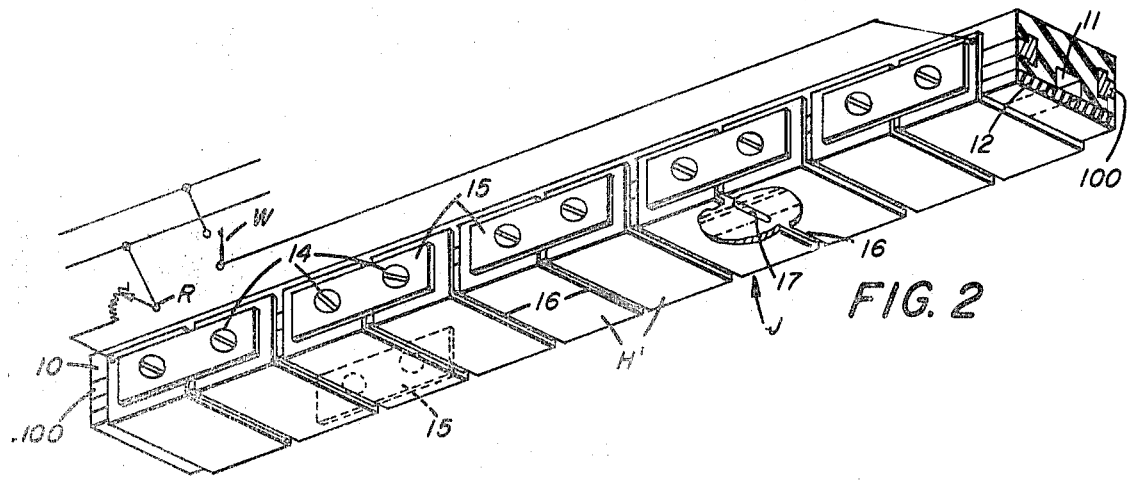
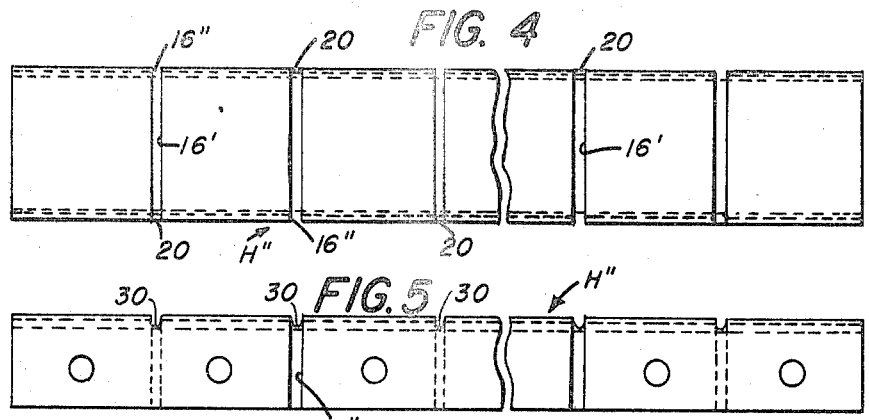
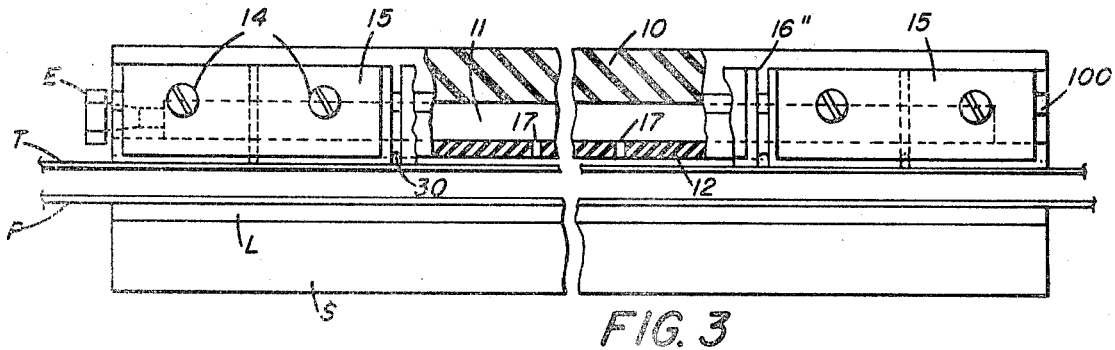
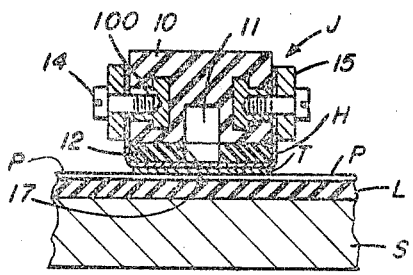
RONALD E. GRIFFITH
HOLLIS T. GALLEY
INVENTORS
BY
ATTORNEYS United States Patent Office 3,573,140
Patented Mar. 30, 1971

3,573,140
HEATING JAW FOR IMPULSE SEALER
Ronald E. Griffith, Rochester, and Hollis T. Galley, Penfield, N.Y. (both of Kodak Park, Rochester, N.Y. 14650)
Filed Oct. 7, 1968, Ser. No. 765,310
Int. Cl. B30b 15/34
U.S. Cl. 156—583                                      9 Claims

ABSTRACT OF THE DISCLOSURE

The heating jaw for a heat sealer of the impulse type comprises an elongated block of insulating material on the bottom face of which there is mounted an electrical heating element comprising a plurality of resistor strips of metal of high specific resistance electrically connected in series but physically spaced apart to allow for expansion and contraction of the strips when an impulse of current is passed therethrough. The block of insulating material has a vacuum chamber extending along the length thereof and communicating with the spaces between the resistor strips so that a length of heat-sensitive splicing tape can be held on the jaw by vacuum when said vacuum chamber is evacuated.

---

This invention relates to the art of splicing the ends of two webs together with a heat-sensitive splicing tape, and, more particularly, to a novel and improved electrically heated sealing jaw of the thermal impulse type.

When splicing wide strips of paper, e.g. 12″, on spooling machines the ends of the two strips of paper are first squared, then brought into abutting relation and finally the ends are joined by a relatively wide, e.g. 1″, heat-sensitive tape applied under pressure by a heating jaw.

Conventional splicing jaws for this purpose are heated with thermostatically controlled cartridges placed in jaws of iron. Jaws heated in this manner are relatively slow to warm up and cool off. Therefore, the iron is maintained at the desired sealing temperature even though the splicing operation is intermittent. Impulse sealers using heater elements in the form of thin and narrow strips of metal of high specific resistance, such as a suitable nickel-chromium alloy known in the trade as Nichrome, have been used for sealing thermoplastic sheeting, but the seals so made have been relatively short and/or narrow so that continuous Nichrome wires or ribbons could be satisfactorily used as the heating element.

The object of the present invention is to provide an electrically heated sealing jaw which overcomes the noted disadvantages and limitations of the prior art and possesses the following advantages:

(a) Prevents operator burns since the jaw need not be heated except when splices are made;

(b) Allows for a cooling cycle after the splicing material has been fused. This is desirable with thermoplastic splicing materials to insure that the thermoplastic adhesive is set before the pressure is removed from the connection;

(c) Thermosetting splicing tapes can be pre-placed on the heating jaw without being heated to an extent that would destroy their adhesive properties;

(d) The splicing tape is held on the heating jaw by vacuum so that the heating jaw can be moved from above into pressing relation with a stationary support on which the webs to be spliced can be readily situated in butting relation.

The novel features that we consider characteristic of our invention are set forth with particularity in the appended claims. The invention itself, however, both as to its organization and its methods of operation, together with additional objects and advantages thereof, will best be understood from the following description when read in connection with the accompanying drawings in which:

FIG. 1 is a transverse cross-sectional view of splicing apparatus having a heated jaw constructed in accordance with the present invention, the heating jaw being shown in its lowered or operative position where it is pressing a strip of heat sensitive tape into superposed relation with the butted ends of two webs to be spliced together;

FIG. 2 is an isometric view of a heating jaw constructed in accordance with one embodiment of the present invention;

FIG. 3 is a side elevational view, partly in section, showing a tape splicer having a heating jaw constructed in accordance with another embodiment of the invention; and FIGS. 4, 5 and 6 are a top plan, a side elevational and an end view, respectively, of the heating element used on the heating jaw shown in FIG. 3.

In general, the present invention concerns an improved electrically heated sealing jaw of the thermal impulse type which moves from above and down into pressing relation with a stationary support to apply heat and pressure to a heat-sensitive splicing tape superimposed upon the squared ends of two webs located in butting relation on the stationary support. The heating element of the heating jaw is constructed so that it can readily expand and contract as it is heated and cooled and so that vacuum can be applied along the length of the lower face of the heating jaw to hold a length of splicing tape thereon while the heating jaw is being moved into pressing relation with the butted ends of two webs positioned on the stationary support.

Referring now to the drawings, FIG. 1 shows the manner in which a splice is made using a heat seal splicer having an electrically heated sealing jaw constructed in accordance with the present invention. The ends of two webs of paper P, or other material, after being squared, are butted on the top of a stationary support S which, if it is metal, may have a layer L of heat and electrical insulating material on the top thereof to reduce the dissipation of heat from the sealing jaw into the support and to prevent accidental short circuiting of the sealing jaw in the event the jaw comes in direct contact with the support. A length of heat-sensitive tape T, is held onto the lower face of heating jaw J by a vacuum to be brought down upon the butted web ends when a downward pressure is applied to the jaw at the same time a surge of current is passed through a heater element H made of a metal having a high specific resistance, such as Nichrome (a nickel base alloy containing 11–22% chromium and small amounts of silicon and manganese). No means is shown for lowering the heating jaw J down into engagement with the web ends located on the top of the support S, and/or closing a switch to pass an impulse of current through the heating jaw at this time, because such features are well known, being shown in U.S. Patent 2,460,460, and form no part of the present invention.

Referring now to FIG. 2, an electrically heated sealing jaw constructed according to one embodiment of the present invention will be described which includes a flat form of resistor having dimensions comparable to that of the splicing tape, e.g., 1″ wide and up to 12″ long. If a resistor of this size was made from a continuous flat strip disposed along the length of the jaw, as taught by the prior art, sufficient expansion would occur therein during the heating cycle to stress the strip beyond its elastic limit thus producing excessive distortion and ultimate failure thereof. However, this expansion is tolerable when the resistor comprises a plurality of short strips H′ of .005″–.010″ thick Nichrome, or other metal having a high specific resistance, ribbon which are spaced along the length of the heat sealing jaw J and are connected in electrical series. The expansion which occurs tends to diminish the spacing between the individual strips.

In the FIG. 2 embodiment, the heating jaw J comprises an elongated block 10 of electrical insulating material, e.g., Synthane, bone, etc., having a recess 11 formed in, and extending along the length of, the lower face thereof. This recess is covered by a strip 12 of electrical insulating material, e.g. 1/16''–1/8'' melamine, cemented or otherwise fastened, to the lower face of the block. The short resistor strips H' are made in the form of U-shaped channels and are slid up onto the lower face of the heating jaw so that the upright arms thereof engage opposing side walls of the block 10 while the cross arms thereof engage the strip 12 of insulating material and in combination constitute the heating and pressure applying surface of the jaw. The resistor strips are mounted in spaced relation along the block 10 by screws 14 passing through the side arms thereof and into the block 10. These resistors are electrically connected in series by a plurality of brass, or other good conducting material, straps or bus bars 15 which can be drawn down into good surface contact with the upright arms of the resistor strips by the same screws 14 which serve to mount the strips onto the block 10. It will be observed that in order to obtain the desired series connection between the several resistor strips H' the conductor straps 15 on the front side of the jaw, looking at FIG. 2, are staggered with relation to a plurality of conducting straps 15 on the back side (only one being indicated in dotted lines). Any expansion which occurs in the resistor strips H' upon their being heated tends to diminish, but not completely close, the spaces 16 between them. The resistors H' are connected in circuit with a source of power in the manner schematically indicated in FIG. 2 so that an impulse of current will be passed through the resistors H' to heat them when a switch W is momentarily closed. A potentiometer R may be included in the circuit to adjust the amount of current applied to the resistors so that they will be heated to the temperature required by the heat sealing characteristics of a specific type of heat-sensitive tape being used. As mentioned above, this switch may be operated by, and in timed relation with, the means for lowering the heating jaw onto the webs so that the jaw will not be heated until just before, or after, the jaw has been brought down upon the web ends to be spliced together. The opening of the switch may be controlled by a timer as suggested by the above-noted prior art.

Since the cross arms, indicated by dimension B, of the resistor strips H' have a greater cross-sectional area and mass than either of the side arms, indicated by dimension A, they will have a lower electrical resistance factor than the side arms and will heat up less than the side arms when an impulse of electrical current is passed therethrough. One way of obtaining the maximum and uniform heating in the cross arms of the resistors and a minimum of heating of the side arms is to increase the electrical conductivity of the side arm portions. This can be done by increasing the cross-sectional area or mass of the side arms relative to that of cross arms which will in effect lower the specific resistance of the side arm portions of the strip relative to that of the cross arm of the strip. To this end we have shown the cross-sectional area of the bus bars 15 being relatively large as compared to the cross-sectional area of the cross arms of the resistor strips H'. In addition, we have shown the screws 14 threaded into strips 100 of a good electrical conducting material embedded in the block 10 behind each bus bar 15. These conducting strips 100 not only increase the conductivity between the side arms of adjacent resistor strips H', but provide a more satisfactory method of attaching the bus bars and resistor strips to the block because when the screws are threaded directly into a block of plastic or other insulating material, they tend to strip out quite easily under repeated use of the bar. Another way in which its cross-sectional area and the conductivity of the side arms of the resistor strips H' could be increased relative to that of the cross arms would be to make the side arms twice as long as required and double them back upon themselves as indicated at dimension A in FIG. 6. A further manner in which this could be accomplished would be to make the resistors from a flat strip of metal whose center portion, that corresponding to dimension B of the formed-up resistor, thinner than the outside edges, those portions corresponding to dimension A of the side arms of the resistor.

One, or both, ends of the block 10 is provided with an exhaust port E (see FIG. 3) to which a vacuum pump or other pressure reducing means, not shown, can be connected to evacuate the recess 11 extending along the length of the block 10. The dielectric strip 12 is slotted, or provided with holes, as indicated at 17 in FIG. 3, which coincide with the spaces 16 between the resistor strips H'. These slots or holes 17 form conduits between the recess and the atmosphere permitting a length of splice tape T to be held in place on the face of the heating jaw by vacuum. This not only allows the heating jaw to be mounted above the stationary support S so that the ends of the webs to be spliced can be readily positioned in butted relation on the stationary support S without having to place the tape T over the joint to obscure the ends of the tape, but also permits a desired length of tape T to be pulled from a source of supply and placed on the jaw while it is cool. Being able to locate a length of splicing tape on the jaw in this manner also insures that the tape will ultimately be brought down into proper engagement with the web ends when the jaw is lowered to its operative position. This is a desired improvement over the conventional procedures wherein a length of splicing tape is placed directly on the butted ends of two webs before the heating jaw is brought down onto the tape because in this case the placement of the tape on the web ends can accidentally separate the web ends and such a condition will not be noticed because the tape covers the ends of the webs.

The assembly of a heating jaw constructed in accordance with the embodiment shown in FIG. 2 has the disadvantage that because of the fact that the heating element is made up of a plurality of separate resistor strips H' it is rather tedious and time consuming to assemble. This disadvantage is overcome by making the heating element in the manner as disclosed in the embodiment shown in FIGS. 3–6 now to be described.

In this embodiment the only difference is found in the construction of the heating element. Here the resistor H'' is a single member made from a channel-shaped ribbon of Nichrome. The channel is separated into a plurality of resistor sections by having the cross arm thereof slotted as shown at 16', by a sawing or by a photoetching technique, at points equally spaced along the length thereof. Alternate ones of these slots 16' are extended down opposite upright arms of the channel, as indicated at 16'', so that each immediate pair of adjacent resistor sections are physically and electrically connected together only by upright walls on opposite sides of the channel as indicated at 20. This construction not only connects the several resistor sections in electrical series but permits the heating element to be handled as a single piece during its assembly to the block 10. This resistor element H'' is mounted on the block 10 by screws 14 threaded into the block 10 as above mentioned. Since restricted connecting sections 20 would show a relatively high resistance and tend to heat up more than the cross arm dimension B of the resistor strips, a relatively thick bus bar 15 is drawn down into contact with the side arms by screws 14 in bridging relation with each restricted connecting section 20. These bus bars are used to improve the electrical conductivity between the resistor sections and thus eliminate any excessive heating which might occur at the narrow upright wall sections 20 joining the respective resistor sections because of a high resistance such limited sections might possess. It will be understood that these bus bars do not bridge the slots 16'' in the side arms of adjacent resistor strip sections, but only the upright wall sections 20 for otherwise the resistor sections would be electrically connected in parallel rather than in series. A parallel electrical connection is not desirable because it would require much more current to heat the resistor sections to a desired temperature than does a series connection. The top edge of that portion of each wall section physically and electrically connecting the resistor sections together (and indicated at 20) is slotted in alignment with the slots 16' in the cross arms as indicated at 30 in FIG. 5. These slots 30 are in effect extensions of the slots 16' and are made just long enough to extend below the edge of the bus bars 15, see FIG. 3 for the purpose of preventing hot spots from occurring in the resistor elements at these corners.

When the resistor element H" is properly mounted on the block 10 the slots 16' between the several resistor sections will align with slots 17 in the plate 12 so that when vacuum is applied to the recess 11 by way of exhaust port E a strip of heat-sensitive splicing tape T can be held on the lower face of the heating jaw by vacuum. To perform a splicing operation with a device having an electrically heated sealing jaw of this type the jaw is first moved to a raised position, as shown in FIG 3, and a strip of heat-sensitive tape T is located on the jaw by vacuum being applied to the recess 11 through the exhaust port E. Since the current is cut off from the heating element at this time and it is cool, there is no chance of the operator getting burned. Also, since the jaw is cool at this time a tape having a thermosetting adhesive could be used if desired. The ends of the webs to be spliced, after being squared, are then placed on the stationary support S with their ends butting along a line which will be covered by the tape as the jaw is brought down into operative position. When the web ends have been properly butted, means, not shown, are actuated to lower the heating jaw to its operative position where it presses the strip of splicing tape T onto the joint between the web ends. After, or just prior to, the jaw reaching its operative position, the switch W may be closed for a time controlled by a timer to pass an impulse of electric current through the resistor element H" for heating the same to a temperature high enough to activate the heat-sensitive adhesive of tape T. If the heat-sensitive adhesive is one of the thermosetting types, then the jaw can be raised after or just as the switch is opened to cut the current off the heating element. If, on the other hand, the heat-sensitive adhesive is one of the thermoplastic types, then it might be desirable to cut the current off from the heating element before the jaw is raised so as to allow the adhesive to set while the joint is held under pressure. In most cases it is desirable to cut the vacuum off from the heating jaw just before it is raised so that the jaw will have no tendency to pull the tape away from the webs being spliced. However, in some instances, depending upon the degree of vacuum applied to the tape, and depending upon the character of the adhesive used, it may be possible to leave the vacuum on the jaw at all times although there is little, if any, advantage in doing so since this would make it more difficult to properly orient the strip of tape on the heating jaw when it is initially placed thereon. Using an electrically heated jaw 12" long and 1" wide constructed according to the present invention, and using a pressure of 80 p.s.i. on the jaw, we have found that a satisfactory splice can be made with a tape having a thermoplastic adhesive requiring a 300° F. temperature to activate it by the application of a current of 30 amps. for a duration of 8 secs. Since there are a number of parameters controlling the splice, other temperatures, voltages and times will give satisfactory splices depending upon the character of the splicing tape being used, the nature of the webs being spliced, etc.

While we have shown and described certain specific embodiments of our invention we are fully aware that many modifications thereof are possible. Our invention, therefore, is not to be restricted to the precise details of construction shown and described, but is intended to cover all modifications coming within the scope of the appended claims.

We claim:

1. An electrically heated sealing jaw for applying heat and pressure to a length of heat-sensitive splicing tape applied in overlapping relation with the ends of two webs positioned in splicing relation on a rigid support, and comprising:
   a substantially rigid elongated backing member of insulating material relatively movable with respect to said rigid support between an inoperative position, wherein a lower face thereof is spaced from said support, and an operative position, wherein said lower face presses a strip of splicing tape into engagement with the ends of two webs positioned on said support;
   a plurality of resistor strips of metal of high specific resistance each extending transversely, and spaced from one another longitudinally, of the lower face of said backing member;
   and means for so connecting said resistor strips in electrical series that they may each be simultaneously uniformly heated by the passage of an impulse of a direct current therethrough.

2. An electrically heated sealing jaw for applying heat and pressure to a length of heat-sensitive splicing tape applied in overlapping relation with the ends of two webs positioned in splicing relation on a rigid support, and comprising
   a substantially rigid elongated backing member of insulating material relatively movable with respect to said rigid support between an inoperative position, wherein a lower face thereof is spaced from said support, and an operative position, wherein said lower face presses a strip of heat-sensitive splicing tape into engagement with the ends of two webs positioned on said support;
   a plurality of U-shaped resistor strips of metal having a high specific resistance arranged on said backing member so that the cross arms thereof extend transversely, and are spaced from one another longitudinally, of the lower face of said backing member and the upright arms embrace said backing member; and
   means for connecting said resistor strips in electrical series so that they will each be uniformly heated by the passage of an impulse of electrical current therethrough, including electrical conductors physically connecting the upright arms of adjacent pairs of strips alternately at opposite sides along the length of said backing member and providing an electrical connection between adjacent resistor strips having a specific resistance less than the specific resistance of the cross arms of said resistor strips.

3. An electrically heated sealing jaw as set forth in claim 2, wherein said resistor strips are electrically connected in series by a plurality of conductors separate from said strips, one of each of said conductors physically connecting alternate adjoining pairs of said strips along two surfaces of said backing member other than the lower face thereof.

4. An electrically heated sealing jaw as set forth in claim 2, and including means for applying a vacuum to the lower face of said backing member for holding a length of splicing tape thereon.

5. An electrically heated sealing jaw as set forth in claim 4, wherein said vacuum applying means includes a vacuum chamber within and extending longitudinally of said backing member which is adapted to be evacuated; and conduits extending from said vacuum chamber and opening out onto the lower face of said backing member at points substantially in alignment with the spaces between said resistor strips.

6. An electrically heated sealing jaw as defined in claim 2, wherein said backing member has sides extending substantially perpendicular to the lower face thereof, and wherein said resistor strips have a U-shaped cross-section and are positioned on said backing member with the upright arms of the resistor strips engaging the sides, and the cross-arm engaging the lower face of said backing member; and wherein said strips are physically joined together in electrical series relation by having the opposite arms of each strip integrally connected along diagonally opposed edges with the opposite arms of the immediately adjoining strips to facilitate handling of all of said strips as a single unit when assembling the components making up said heating jaw.

7. An electrically heated sealing jaw as defined in claim 6, wherein the integral connection between the side walls of adjoining strips terminates at a point short of the corner between the upright arms and the cross-arms of adjoining strips to eliminate a hot spot at this point when an impulse of electric current is passed through the group of strips.

8. An electrically heated sealing jaw as defined in claim 6, including means for mounting said resistor strips on said backing member comprising a bus bar in surface contact with the upright arms of adjacent resistor strips and in bridging relation with the integral connection therebetween and a fastener extending through said bus bar and each of the upright arms of said strips and into the sides of said backing member to draw said bus bar and upright arms down against the sides of said backing member.

9. An electrically heated sealing jaw for applying heat and pressure to a length of heat-sensitive splicing tape applied in overlapping relation with the ends of two webs positioned in splicing relation on a rigid support and comprising a substantially rigid elongated backing member of insulating material having a lower face and sides extending substantially perpendicular thereto, said backing member movable with respect to said rigid support between an inoperative position, wherein a lower face thereof is spaced from said support, and an operative position, wherein said lower face presses a strip of heat-sensitive tape into engagement with the ends of two webs positioned on said support; a plurality of U-shaped resistor strips of metal having a high specific resistance spaced apart longitudinally of said backing member and positioned on said backing member with the upright arms of the strips engaging the sides, and the cross arm engaging the lower face, of said backing member; and means for connecting said resistor strips in electrical series so that they will each be uniformly heated by the passage of an impulse of electrical current therethrough, including an electrical conductor of low specific resistance extending between the upright arms of each adjacent pair of resistor strips, and a screw extending through the upright arms of the resistor strips and into the sides of the backing member to provide an electrical connection between the upright arms of said strips which have specific resistance lower than that of the cross arms of said strip.

References Cited

UNITED STATES PATENTS

| | | | |
|---|---|---|---|
| 2,574,095 | 11/1951 | Langer | 156—583 |
| 2,590,562 | 3/1952 | Nielsen | 156—380X |
| 3,198,681 | 8/1965 | Watts, Jr. | 156—285X |

SAMUEL FEINBERG, Primary Examiner

J. J. DEVITT, Assistant Examiner

U.S. Cl. X.R.

156—380